Sept. 4, 1934.  E. E. EASTERDAY  1,972,584
SETTLING APPARATUS
Filed Sept. 6, 1932  3 Sheets-Sheet 1

Sept. 4, 1934. E. E. EASTERDAY 1,972,584
SETTLING APPARATUS
Filed Sept. 6, 1932 3 Sheets-Sheet 2
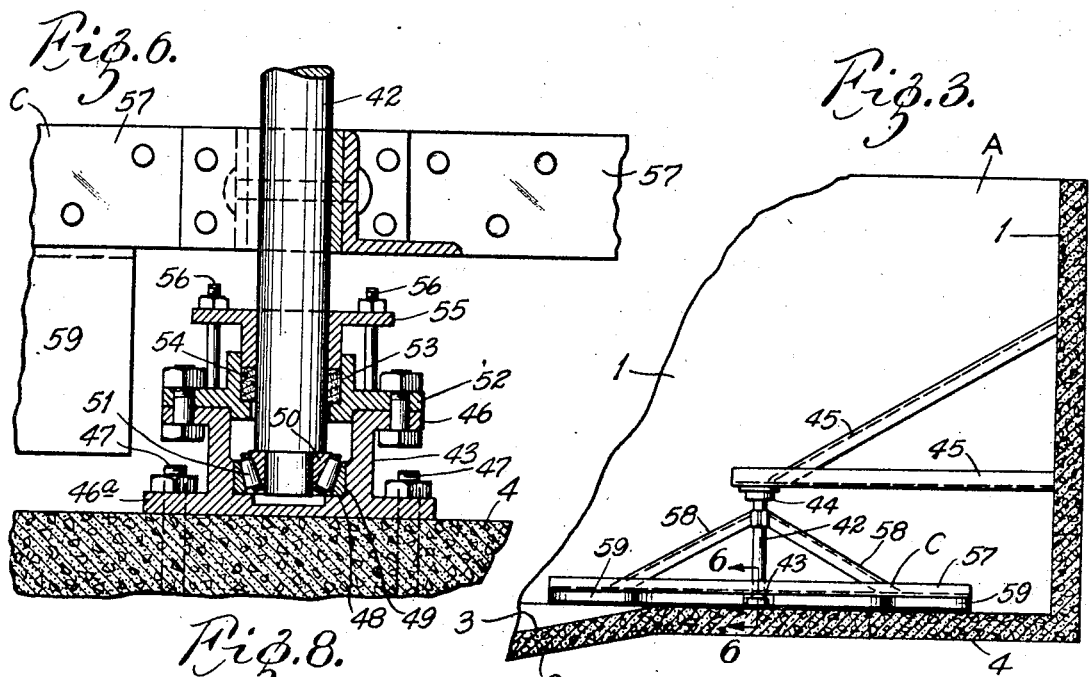
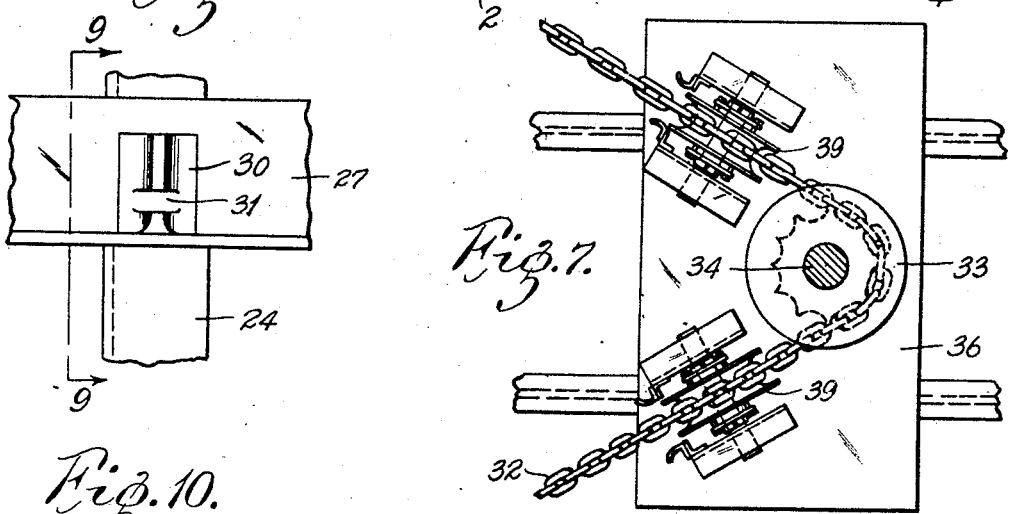
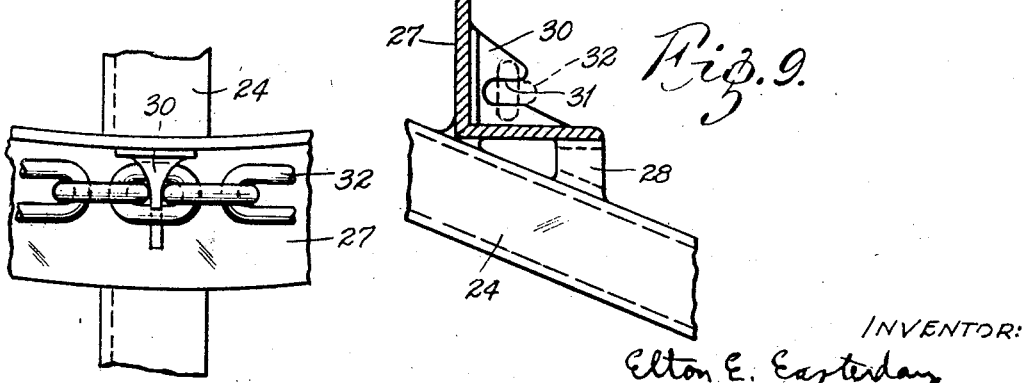
INVENTOR:
Elton E. Easterday,
by Carr Pearl & Gravely,
HIS ATTORNEYS Sept. 4, 1934.   E. E. EASTERDAY   1,972,584
SETTLING APPARATUS
Filed Sept. 6, 1932   3 Sheets-Sheet 3

INVENTOR
Elton E. Easterday
by Cantton & Grandy
HIS ATTORNEYS

Patented Sept. 4, 1934

1,972,584

UNITED STATES PATENT OFFICE 1,972,584

SETTLING APPARATUS

Elton E. Easterday, St. Louis, Mo.

Application September 6, 1932, Serial No. 631,814

10 Claims. (Cl. 210—55)

This invention relates to apparatus for continuously gathering together material which has settled out of solution or suspension; and it is particularly adapted for scraping and removing sludge from the bottom of settling basins.

The invention has for its principal object to provide scraping apparatus which is capable of reaching and scraping material from substantially all of the floor surface of a non-circular basin and then moving such material to a common point so that it can be readily removed. Another object is to provide apparatus of this type which is extremely durable and which requires a comparatively small amount of power to operate it.

The invention consists principally in apparatus employing a main scraper device including a rotary element provided with scraper arms for scraping a portion of the floor surface of a basin, and an auxiliary scraper device which is driven by engagement with the scraper arms of the main scraper device and which is arranged to scrape material from a portion of the floor surface of the basin outside the surface zone traversed by the main scraper and to shift such material unto the surface zone traversed by the latter device. The invention also consists in providing the scraper arms of the main device with a series of spiral blades which are arranged to shift the material engaged thereby toward the axis of the device; and in providing the auxiliary device with blades which are arranged to shift the material engaged thereby outwardly away from its axis and into the path of the scraper arms of the main device. The invention also consists in a driving mechanism for the main scraper device which comprises a comparatively large driving ring mounted on the scraper arms of the main device, and a sprocket chain mounted around such driving ring and around a comparatively small sprocket wheel which is driven by a suitable source of power. The invention also consists in the settling apparatus, and in the parts, and combinations and arrangements of parts hereinafter described and claimed.

Figure 1:
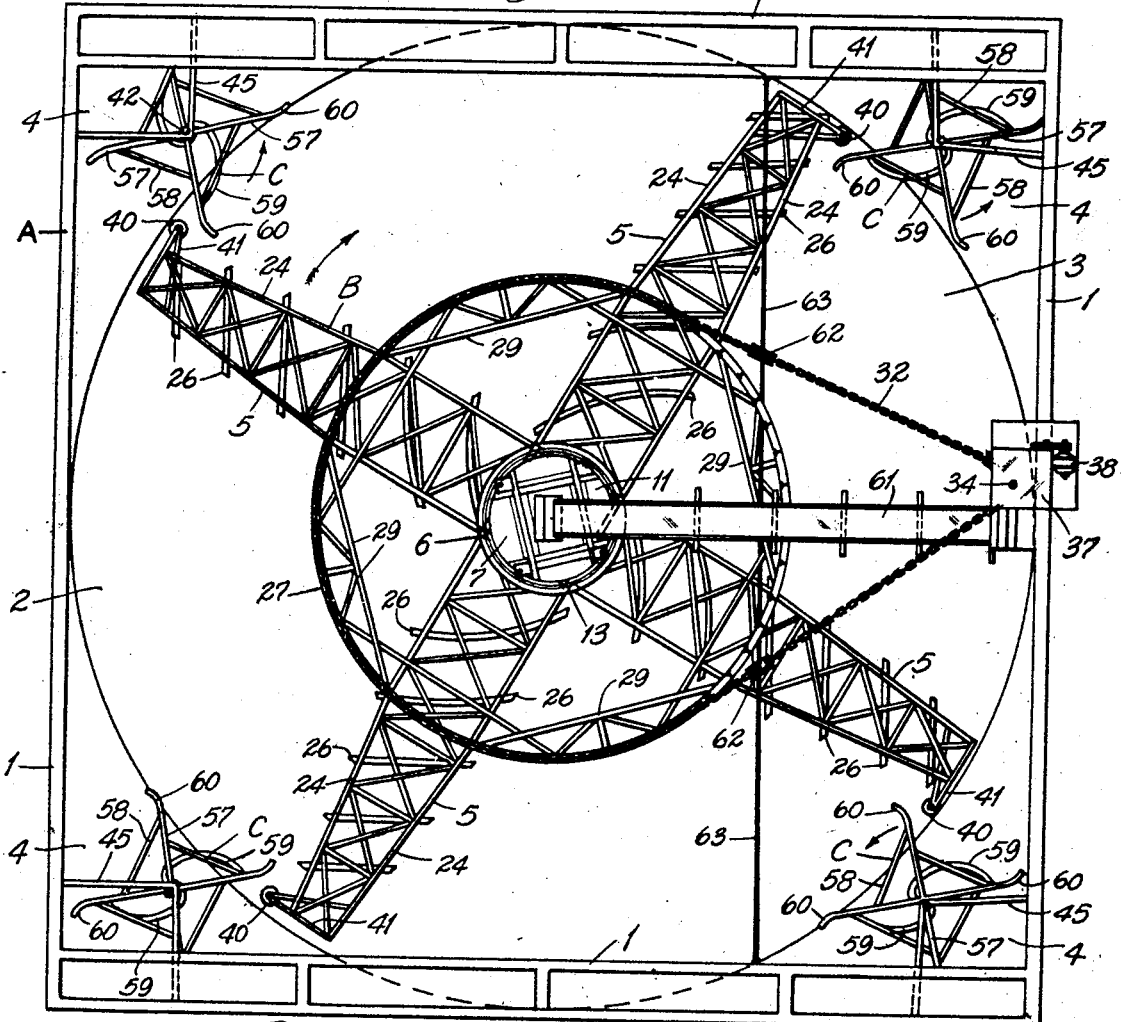
Figure 2:
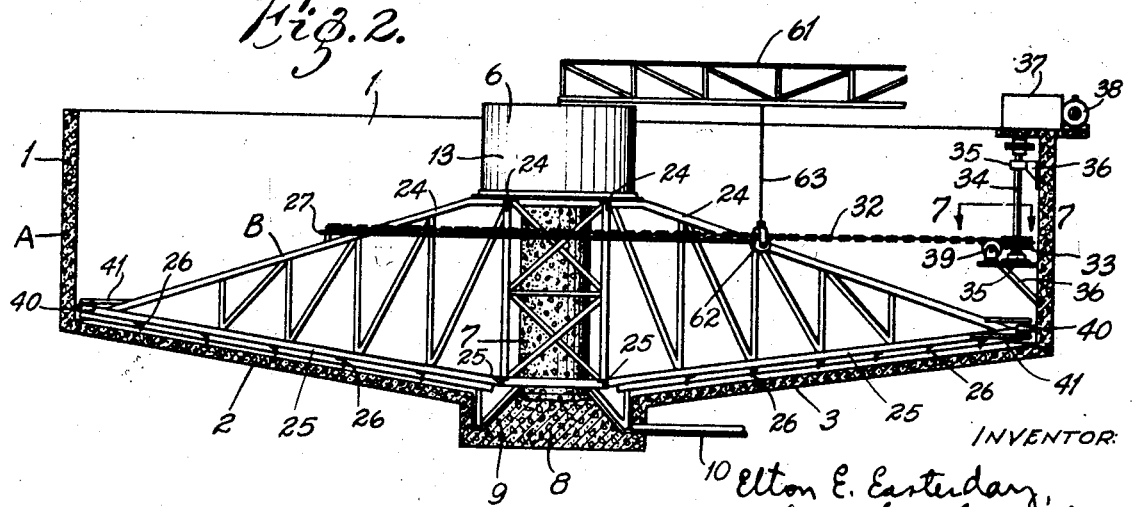

In the accompanying drawings which form part of this specification and wherein like reference symbols refer to like parts wherever they occur, Fig. 1 is a plan view of a water works settling basin equipped with settling apparatus embodying my invention, Fig. 2 is a side elevation of the apparatus with the settling basin shown in section, Fig. 3 is an enlarged side elevation of one of the auxiliary corner scraper devices, with the wall and floor of the basin shown in section.

Figure 4:
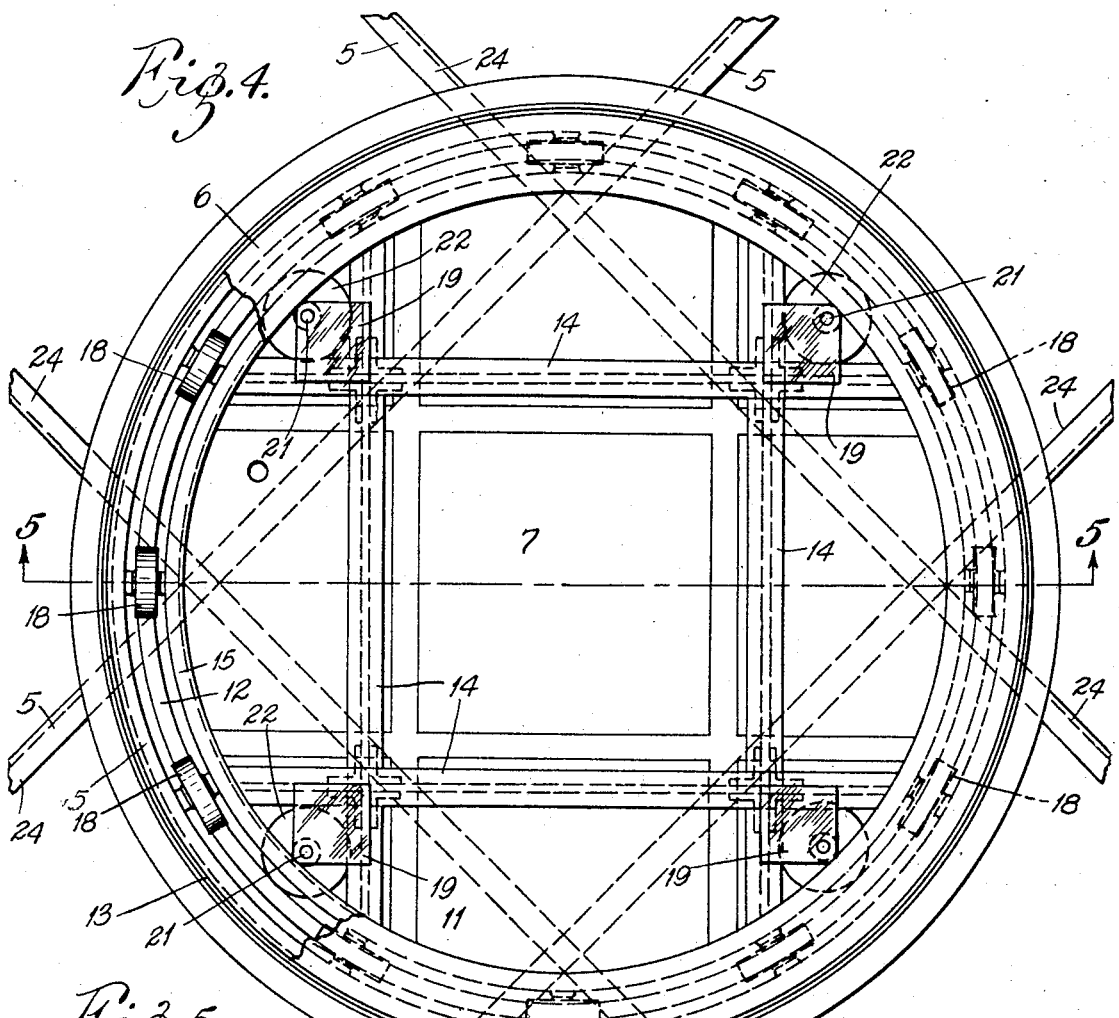
Figure 5:
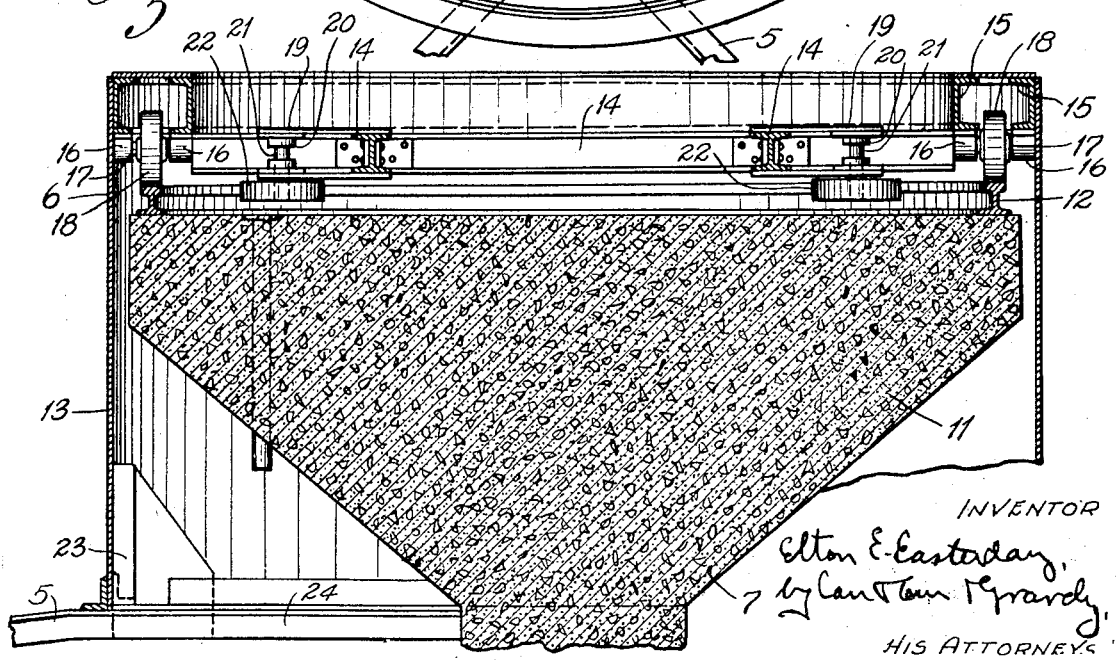

Fig. 4 is an enlarged plan view, with parts broken away, of the main scraper device turntable structure, Fig. 5 is a sectional view along the line 5—5 in Fig. 4, Fig. 6 is an enlarged vertical section along the line 6—6 in Fig. 3, Fig. 7 is an enlarged sectional view along the line 7—7 in Fig. 2, Fig. 8 is an enlarged side view of part of the main scraper driving ring with the driving sprocket chain removed, Fig. 9 is a sectional view along the line 9—9 in Fig. 8, Fig. 10 is a plan view of Fig. 8, with the driving sprocket chain in place.

In the accompanying drawings is shown a rectangular setting basin A of reinforced concrete construction comprising side walls 1 and a floor 2. The floor 2 of the basin slopes downwardly from the side walls to the center of the basin to form a central conical surface portion 3, whereas the corner surface portions 4 of the floor are made flat. A main scraper device, generally designated as B, is mounted within the basin A, and it is arranged and adapted to scrape the central conical surface portion 3 of the floor of the basin; whereas auxiliary scraper devices, generally designated as C, are mounted within the basin in each corner thereof, respectively; and these auxiliary scraper devices are arranged and adapted to scrape the flat corner surface portions 4 of the floor of the basin which are not reached by the main central scraper device B.

The main central scraper device B comprises four radial scraper arms 5, of riveted angle iron open frame work construction, which are supported by a cylindrical turntable structure 6 which is mounted on the top of an upright column 7 of reinforced concrete construction located in the center of the settling basin. The column 7 has an enlarged conical base portion 8, and the floor of the basin surrounding this base portion 8 is grooved to form a substantially V-shaped sludge discharge trough 9; and a suitable sludge discharge pipe 10 communicates with the bottom of said trough. The column 7 has an enlarged, inverted conical upper end portion 11; and mounted on top of this portion 11 is a circular ring of track 12 which is suitably secured thereto. The turntable structure 6 comprises a cylindrical casing 13 surrounding the enlarged upper end portion 11 of the column. The upper end of this casing 13 is stiffened by means of cross I-beam members 14 which are connected to each other and to the inside of the cylindrical casing, and a pair of concentrically arranged spaced channel members 15 having their flanges facing each other are mounted on the tops of these I-beam members with the outermost channel member abutting against the inner periphery of the casing adjacent to its upper end and suitably secured thereto. Provided on the lower flange portions at regular intervals around these channel members 15 is a series of horizontal bearings 16 in which are mounted shafts 17 having wheels 18 fixed thereon which rest on the top of the track 12 extending around the top of the concrete column, and plates 19 fixed to the cross I-beam members 14, are provided with vertical bearings 20 in which are mounted stub shafts 21 having horizontally disposed wheels 22 fixed on their lower ends which engage the sides of the track 12 for keeping the turntable structure on the track.

The casing 13 has an angle extending around its outer periphery at its lower end and suitably secured thereto for stiffening its lower end, and the scraper arm frames 5 are secured to this angle and to suitable gusset plates 23 fixed to the casing. Each scraper arm comprises upper corner angles 24 and lower corner angles 25 which are connected together by braces; and the scraper arm frames are tapered so that the lower corner members extend substantially parallel to the floor of the basin. The lower corner members 25 of each pair of oppositely disposed radial scraper arm frames extend continuously across the basin, and these members are suitably braced to the upper corner members and to the turntable casing so that the scraper arms are rigidly affixed to the turntable structure so as to rotate therewith. Mounted on the lower corner members of each scraper arm frame is a series of spirally arranged scraper blades 26 adapted to scrape the central conical floor surface portion of the basin. These blades 26 are, preferably, made successively smaller, and are spaced successively closer together, from the turntable end to the outer end of the scraper arm frame.

Extending around the axis of the turntable structure of the main scraper device is a comparatively large continuous driving ring 27 supported on the top of each scraper arm frame substantially midway between its turntable end and its outer end. This driving ring is made out of an angle member which is secured to upright members 28 which are secured to the top corner members 24 of each scraper arm frame; and the driving ring angle is suitably braced by horizontally disposed stiffening trusses 29 which are secured to the scraper arm frames. The driving ring angle is provided at regular intervals with lug-like brackets 30 having horizontally disposed slots 31 therein and constituting sprocket teeth. Mounted around the driving ring is an endless sprocket chain 32 which is driven by a comparatively small sprocket wheel 33 located adjacent to one side of the basin. This sprocket wheel 33 is fixed on a vertical shaft 34 which is mounted in bearings 35 provided on upper and lower brackets 36 extending from the side wall of the basin. A gear speed reducer 37 is operatively connected to the upper end of this shaft 34, and a motor 38 is arranged to drive the gear speed reducer. Preferably, a pair of idler pulleys 39 are fixed on the lower sprocket wheel shaft supporting bracket 36 in such location as to properly guide the sprocket chain 32 as it enters and leaves the groove of the driving sprocket wheel 33.

The auxiliary scraper devices C, which are adapted to scrape the flat corner portions of the basin, are driven by engagement with rollers 40 provided on supporting members 41 extending from the scraper arm frames of the main scraper device adjacent to their outer ends. Each auxiliary scraper device comprises a vertically disposed shaft 42 having its lower end extending into a bearing housing 43 provided on the bottom of the basin and its upper end extending into a bearing housing 44 supported on bracket members 45 extending from the side walls of the basin. The lower housing has horizontally disposed annular flanges 46 and 46a extending outwardly from its upper and lower ends, respectively, and it is secured to the floor of the basin by a series of anchor bolts 47 extending through the lower annular flange 46a. The housing has an annular seat 48 therein for receiving a cup 49. A cone 50 adapted to cooperate with said cup is mounted on a reduced end portion of the shaft with its larger end abutting against the shoulder formed by reducing the end of the shaft; and a series of rollers 51 are interposed between the cup and cone. An enclosure ring 52 is mounted around the shaft and is secured to the upper flange 46 of the housing. This enclosure ring has an annular recess 53 adjacent to the periphery of the shaft for receiving a packing ring 54, and an adjustable packing gland ring 55 is fixed on stud bolts 56 extending upwardly from the enclosure ring, and the gland ring has an annular flange extending therefrom for compressing the packing ring 54. The construction and arrangement of the upper bearing is similar to that of the lower one.

Fixed to the shaft 42 just above the lower bearing is a series of four radially disposed arms 57 which rotate with the shaft, and these arms 57 are connected together and braced by suitable connecting members 58. The radial arms 57 are made long enough so that their outer end portions overlap the outer end portions of the scraper arm frames of the main scraper device and pass over the outer edge of the conical floor surface of the basin. The driving rollers 40 are disposed in such position so that they will engage the radial arms of the auxiliary scraping devices. Fixed on the bottom of the arms 57 are two spirally curved scraper blades 59 extending from opposite sides of the shaft 42 and adapted to scrape the flat floor surface portion around the axis of the auxiliary scraper and to shove the material scraped thereby outwardly and away from the axis of the device. Also fixed on the arms 57, and located at the outer ends of the scraper blades 59, are blades 60 which are curved in a reverse manner with respect to the spiral blades 59; and these blades 60 are adapted to catch the material shoved outwardly by the spiral blades and to shift such material around to the lower outer edge portion of the conical floor surface of the basin where it falls thereon and is picked up by the blades of the main scraper device.

Preferably, a foot bridge 61 of suitable construction, extends from the side wall of the settling basin to the top of the central column 7, and it is supported on the wall of the basin and the column in any suitable manner; and in order to prevent the continuous sprocket chain between the driving ring and the small driving sprocket wheel from sagging and to insure proper operation thereof, guide rollers 62 are hung on cables 63 which are fixed to the foot bridge and to the side walls of the settling basin.

In the operation of my scraping apparatus, the spirally arranged scraper blades 26 of the turntable scraper device B move over the entire central conical floor surface portion 3 of the basin, as indicated by the arrows, in a clockwise direction to scrape the deposited material therefrom and to continuously shift or shove such material towards the central axis of the device and thence into the annular sludge discharge trough 9 from where it may be readily removed through the sludge discharge pipe 10 by suction apparatus, or the like. The central scraper, during its rotation, also causes each of the auxiliary corner scraper devices C to rotate in a counter-clockwise direction, as indicated by arrows, due to the engagement of their arms by the rollers 40 provided on the arms of the main scraping device B. During the rotation of each corner scraper device, the spiral-shaped blades 59 move around to scrape the flat floor surface of the corner of the basin and to shift or shove the material deposited thereon away from its axis. Such material, after being moved out of the corner surface zones traversed by the spiral blades 59 is then picked up by the end blades 60 of the corner scraper device which shove the material around until it drops onto the lower floor surface zone traversed by the scraper arms of the central scraper.

Obviously, the scraping apparatus hereinabove described admits of considerable variations without departing from the spirit of my invention. For instance, while I have shown a rectangular-shaped settling basin, it may be feasible to use my apparatus for scraping basins, or tanks, or the like, of almost any shape by using and arranging auxiliary scrapers of different sizes in combination with one or more main scrapers so as to reach substantially the entire floor surface portion of a particular shaped basin or tank. Furthermore, by reversing the operation of my apparatus as hereinabove described, it may be feasible to use the apparatus for distributing material over the floor of a tank, or the like, to assist in mixing the same with a liquid, or gas, within the tank; and as many other changes may be feasible to adapt the apparatus for different kinds of work, I do not wish to be limited to the precise constructions shown and described.

What I claim is:

1. Settling apparatus comprising a rotary element provided with means for scraping a portion of a floor surface, and a separate rotary element rotatable on an axis offset from the axis of rotation of said first named rotary element, and provided with means for scraping another portion of such floor surface and shifting the material scraped therefrom into the path of the scraping means of the first named rotary element, the scraping means of said separate rotary element extending into the path of the floor scraping means of said first mentioned rotary element so as to be rotated thereby.

2. Settling apparatus comprising a rotary element provided with blades for scraping a portion of a floor surface and shifting the material scraped therefrom to a point on such surface, and a separate rotary element rotatable on an axis located adjacent to the periphery of said first named rotary element and provided with curved blades for scraping another portion of such floor surface and shifting the material scraped therefrom into the path of the blades of the first named rotary element, the scraping means of said separate rotary element extending into the path of the floor scraping means of said first mentioned rotary element so as to be rotated thereby.

3. Settling apparatus comprising a rotary element provided with spirally arranged blades for shifting material towards its axis, and a separate rotary element rotatable on an axis located outside of the path of the blades of said first named rotary element and provided with spirally arranged blades for shifting material outwardly away from its axis and into the path of the blades of the first named rotary element, the scraping means of said separate rotary element extending into the path of the floor scraping means of said first mentioned rotary element so as to be rotated thereby.

4. Settling apparatus comprising a rotary element provided with means for scraping a portion of a floor surface, and a separate rotary element rotatable on an axis located outside of the path of the blades of said first named rotary element and provided with means for scraping another portion of such floor surface with one of said rotary elements extending into the path of and being driven by engagement with the other.

5. Settling apparatus comprising a rotary element provided with means for scraping a portion of a floor surface, and a separate rotary element extending into the path of and rotatable on an axis located outside of the path of the blades of said first named rotary element and driven by engagement with the first named rotary element and provided with means for scraping another portion of such floor surface and shifting the material scraped therefrom into the path of the scraping means of the first named rotary element.

6. Settling apparatus comprising a main rotary element having an arm extending outwardly therefrom, spirally arranged scraper blades provided on said arm and adapted to shift material inwardly toward the axis of said rotary element, a separate rotary element having an arm extending outwardly therefrom, a spiral blade provided on said arm and adapted to shift material outwardly away from the axis of said rotary element, and another blade provided on said arm at the end of said spiral blade for shifting the material shifted outwardly thereby into the path of the scraper blades of the first named rotary element.

7. Settling apparatus comprising a main rotary element having scraper frames extending outwardly therefrom, spirally arranged scraper blades provided on said frames for shifting material inwardly toward the axis of said main rotary element, an auxiliary rotary element having scraper arms extending outwardly therefrom, a pair of spiral blades provided on said scraper arms for shifting material outwardly from the axis of said auxiliary rotary element, and other scraper blades provided on said scraper arms at the outer ends of said spiral blades for shifting the material shifted outwardly thereby into the path of the scraper arms of the main rotary element.

8. Settling apparatus comprising a turntable structure, scraper arms extending radially outward therefrom, a driving ring surrounding said turntable structure and fixed to said scraper arms, lugs constituting sprocket teeth provided at intervals around said driving ring, a shaft having its axis of rotation disposed parallel to that of said turntable structure, power means for driving said shaft, a sprocket wheel fixed on said shaft, and a continuous sprocket chain mounted around said driving ring and said sprocket wheel.

9. Settling apparatus comprising a main rotary element having scraper arms extending outwardly therefrom, means for driving said rotary element, an auxiliary rotary element having scraper arms extending therefrom which overlap the outer end portions of the scraper arms of the main rotary element, and means extending from the scraper arms of the main rotary element in position to engage the scraper arms of the auxiliary element for driving the same.

10. Settling apparatus comprising a turntable structure having radial scraper arm frames extending therefrom, a driving ring mounted around the turntable structure and fixed to the scraper arm frames, a shaft spaced away from the turntable structure, means for driving said shaft, a sprocket wheel fixed on said shaft, a continuous sprocket chain mounted around said driving ring and said sprocket wheel, an auxiliary rotary member having scraper arms extending therefrom, and means extending from the scraper arm frames of the turntable structure in position to engage the arms extending from the auxiliary rotary member to drive the same.

ELTON E. EASTERDAY.